US012744138B2

(12) United States Patent
Feng et al.

(10) Patent No.: US 12,744,138 B2
(45) Date of Patent: Sep. 22, 2026

(54) GRAIN BOUNDARY DIFFUSION CERIUM-BASED MAGNET CONTAINING REFe2 PHASE AND PREPARATION METHOD THEREOF

(71) Applicant: Central Iron & Steel Research Institute Company Limited, Beijing (CN)

(72) Inventors: Haibo Feng, Beijing (CN); Anhua Li, Beijing (CN); Wei Li, Beijing (CN)

(73) Assignee: Central Iron & Steel Research Institute Company Limited, Beijing (CN)

( * ) Notice: Subject to any disclaimer, the term of this patent is extended or adjusted under 35 U.S.C. 154(b) by 1320 days.

(21) Appl. No.: 17/904,060

(22) PCT Filed: Apr. 21, 2020

(86) PCT No.: PCT/CN2020/085835
§ 371 (c)(1),
(2) Date: Aug. 11, 2022

(87) PCT Pub. No.: WO2020/233316
PCT Pub. Date: Nov. 26, 2020

(65) Prior Publication Data

US 2022/0415549 A1 Dec. 29, 2022

(30) Foreign Application Priority Data

May 23, 2019 (CN) ........................ 201910434469.9

(51) Int. Cl.
*H01F 1/057* (2006.01)
*H01F 1/053* (2006.01)
*H01F 41/02* (2006.01)

(52) U.S. Cl.
CPC .................................. *H01F 1/0571* (2013.01)

(58) Field of Classification Search
CPC ........ H01F 1/053; H01F 1/057; H01F 1/0577; H01F 41/0293
See application file for complete search history.

(56) References Cited

FOREIGN PATENT DOCUMENTS

CN 104167272 A 11/2014
CN 104851583 A 8/2015
(Continued)

OTHER PUBLICATIONS

Zhang et al., "Effects of REFe2 on microstructure and magnetic properties of Nd—Ce—Fe—B sintered magnets", Acta Materiala, 128, 22-30. (Year: 2017).*
(Continued)

*Primary Examiner* — Matthew E. Hoban
*Assistant Examiner* — Lynne Edmondson
(74) *Attorney, Agent, or Firm* — Alston & Bird LLP

(57) ABSTRACT

Disclosed are a cerium magnet with diffused grain boundaries containing $REFe_2$ and a preparation method therefor, wherein an original cerium magnet contains a 2-14-1 main phase, a $REFe_2$ phase and a rare earth-rich phase, and the REFe 2 phase is a $CeFe_2$ phase or a (Ce,RE')Fe2 phase. The RE" element in a rare earth diffusion source is diffused into the original cerium magnet by means of a grain boundary diffusion treatment at the melting point of the $REFe_2$ phase, and same is then cooled directly or cooled after a tempering treatment to room temperature to obtain a final cerium magnet. The final cerium magnet contains a new 2-14-1 main phase, a new enhanced $REFe_2$ phase and a new rare earth-rich phase, wherein the new 2-14-1 main phase is a (Ce,RE")2Fe14B or (Ce,RE',RE")2Fe14B main phase, and the new enhanced $REFe_2$ phase is a (CeRE")Fe2 phase or a (Ce,RE',RE")Fe2 phase, wherein RE' and RE" are one or more of La, Pr, Nd, Pm, Eu, Gd, Tb, Dy, Ho, Er, Tm, Yb, Lu and Y. The cerium magnet improves the diffusion efficiency
(Continued)

of the element RE" in the diffusion source, and substantially improve the coercivity thereof.

13 Claims, 1 Drawing Sheet

(56) References Cited

FOREIGN PATENT DOCUMENTS

| | | | | | |
|---|---|---|---|---|---|
| CN | 106128672 | A | | 11/2016 | |
| CN | 110148507 | A | | 8/2019 | |
| EP | 3462465 | A1 | * | 4/2019 | ........... H01F 1/0558 |
| JP | 2019016635 | A | | 1/2019 | |

OTHER PUBLICATIONS

International Preliminary Report on Patentability for International Application No. PCT/CN2020/085835, mailed Nov. 16, 2021 (5 pages).
International Search Report for International Application No. PCT/CN2020/085835, mailed Jul. 23, 2020 (6 pages).
Written Opinion of the International Searching Authority for International Application No. PCT/CN2020/085835, mailed Jul. 23, 2020 (8 pages).

* cited by examiner

GRAIN BOUNDARY DIFFUSION CERIUM-BASED MAGNET CONTAINING REFe2 PHASE AND PREPARATION METHOD THEREOF

CROSS REFERENCE TO RELATED APPLICATIONS

This application is a national stage application, filed under 35 U.S.C. § 371, of International Application No. PCT/CN2020/085835, filed Apr. 21, 2020, which claims priority to Chinese Application No. 201910434469.9, filed May 23, 2019, the contents of both of which as are hereby incorporated by reference in their entirety.

TECHNICAL FIELD

The present disclosure belongs to the technical field of rare earth-based permanent magnet materials and relates to a grain boundary diffusion cerium-based magnet containing a $REFe_2$ phase and a preparation method thereof.

BACKGROUND ART

Rare earth-based permanent magnet materials are widely used in electromechanical, information, robotics and intelligent manufacturing fields. With the continuous development of applications such as wind power generation, new energy vehicles, rail transit, robotics, and information, PrNd rare earth as a main raw material are consumed in large quantities, while co-associated and high-abundance rare earths La and Ce are backlogged in large quantities. In recent years, a high-abundance rare earth-based permanent magnet material, cerium magnet, has successfully achieved industrialization with the development of a double main phase preparation technology. The cerium magnet realizes the balanced utilization of rare earth resources, while significantly reducing a raw material cost of the magnet. With the expansion of application range, the cerium magnet is required to have high coercivity and desirable temperature stability. Grain boundary diffusion technology conducts diffusion heavy rare earths such as Dy and Tb or heavy rare earth compounds into a Nd—Fe—B magnet along a grain boundary, to significantly increase the coercivity and improve a temperature coefficient of the magnet. Meanwhile, the technology has been widely used in mass production of high-coercivity Nd—Fe—B magnets due to a simple process, low cost and great coercivity improvement. The cerium magnet prepared by grain boundary diffusion technology has significantly improved coercivity and stability, with desirable market prospects.

The cerium magnet usually includes more than 20 wt % of a rare earth element Ce. Since a $CeFe_2$ phase replaces a Nd phase of a Nd—Fe—B ternary system in a ternary phase diagram of Ce—Fe—B, the cerium magnet has a grain boundary phase including the $CeFe_2$ phase and a rare earth-enriched phase. Moreover, with an increase of the Ce content, the $CeFe_2$ phase has a further increased content in the magnet, which may even completely replace the rare earth-enriched phase. The $CeFe_2$ phase leads to a grain boundary diffusion process and a diffusion behavior of rare earth elements in the cerium magnet different from those of the Nd—Fe—B magnet. In addition, all rare earth elements except La, Nd, Eu and Yb can form the $REFe_2$ phase; since the $REFe_2$ phase has a melting point higher than that of the rare earth-enriched phase, conventional grain boundary diffusion processes have a low diffusion efficiency and a limited increase in coercivity of the cerium magnet. Therefore, there is an urgent need for a grain boundary diffusion technology of a cerium magnet containing a $REFe_2$ phase, represented by the $CeFe_2$ phase, which has a high diffusion efficiency and can greatly improve the coercivity of cerium magnet. The technology can be widely used in batch preparation and industrial production of high-coercivity cerium magnets.

SUMMARY

In view of the above technical problems, an objective of the present disclosure is to provide a grain boundary diffusion cerium-based magnet containing a $REFe_2$ phase. By conducting the grain boundary diffusion near a melting point of the $REFe_2$ phase, a rare earth element in a diffusion source has an improved diffusion efficiency to greatly enhance coercivity of the magnet.

Another objective of the present disclosure is to provide a preparation method of the grain boundary diffusion cerium-based magnet containing a $REFe_2$ phase.

To achieve the above objectives, the present disclosure provides the following technical solutions.

The present disclosure provides a grain boundary diffusion cerium-based magnet containing a $REFe_2$ phase, where an original cerium magnet has a chemical composition of $(Cex,RE'_{1-x})_aFe_{99-a-b}B_{0.9-1.2}TM_b$, x is greater than or equal to 20 wt. % and less than or equal to 85 wt. %, a is greater than or equal to 28 and less than or equal to 35, and b is greater than or equal to 0 and less than or equal to 10; TM is one or more selected from the group consisting of Co, Al, Cu, Ga, Nb, Mo, Ti, Zr, and V; the original cerium magnet is prepared by sintering or hot pressing, and includes a 2-14-1 main phase, the $REFe_2$ phase, and a rare earth-enriched phase; the $REFe_2$ phase is selected from the group consisting of a $CeFe_2$ phase or a $(Ce,RE')Fe_2$ phase, and RE' is one or more selected from the group consisting of La, Pr, Nd, Pm, Eu, Gd, Tb, Dy, Ho, Er, Tm, Yb, Lu, and Y; and an RE" element of a rare earth diffusion source is diffused into the original cerium magnet through the grain boundary diffusion at a melting point of the $REFe_2$ phase as a diffusion temperature; a treated original cerium magnet is directly cooled to room temperature or cooled to room temperature after tempering to obtain a final cerium magnet; and the final cerium magnet includes a new 2-14-1 main phase, a new enhanced $REFe_2$ phase, and a new rare earth-enriched phase; the new 2-14-1 main phase is selected from the group consisting of a $(Ce,RE")_2Fe_{14}B$ main phase and a $(Ce,RE',RE")_2Fe_{14}B$ main phase, the new enhanced $REFe_2$ phase is selected from the group consisting of a $(CeRE")Fe_2$ phase and a $(Ce,RE',RE")Fe_2$ phase; and RE" is one or more selected from the group consisting of La, Pr, Nd, Pm, Eu, Gd, Tb, Dy, Ho, Er, Tm, Yb, Lu, and Y.

Further, the RE" element may form a $(Ce,RE")_2Fe_{14}B$ main phase or a $(Ce,RE',RE")_2Fe_{14}B$ main phase with a core-shell structure at an edge of main phase grains.

Further, an anisotropy field of the $RE"_2Fe_{14}B$ phase may be larger than that of the $Ce_2Fe_{14}B$ phase or the $(Ce,RE')_2Fe_{14}B$ phase.

Further, the grain boundary diffusion may be conducted at 850° C. to 1,000° C. for 0.1 h to 48 h.

Further, the tempering may be conducted at an eutectic temperature of a Ce-RE'-RE"-Fe phase of 400° C. to 700° C. for 0.5 h to 12 h.

Further, the rare earth diffusion source containing the RE" element may be selected from the group consisting of a rare earth metal, a rare earth hydride, a rare earth fluoride, a rare earth oxide, and a rare earth alloy.

The present disclosure further provides a preparation method of the grain boundary diffusion cerium-based magnet containing a $REFe_2$ phase, including the following steps:

a, preparing a blocky original cerium magnet with a chemical composition of $(Ce_x,RE'_{1-x})_a Fe_{100-a-b-c}TM_bB_c$ by sintering or hot pressing, where x is greater than or equal to 20 wt. % and less than or equal to 85 wt. %, a is greater than or equal to 28 and less than or equal to 35, b is greater than or equal to 0 and less than or equal to 10, and c is greater than or equal to 0.9 and less than or equal to 1.5; TM is one or more selected from the group consisting of Co, Al, Cu, Ga, Nb, Mo, Ti, Zr, and V; the original cerium magnet includes the 2-14-1 main phase, the $REFe_2$ phase, and the rare earth-enriched phase; the $REFe_2$ phase is selected from the group consisting of the $CeFe_2$ phase or the $(Ce,RE')Fe_2$ phase, and RE' is one or more selected from the group consisting of La, Pr, Nd, Pm, Eu, Gd, Tb, Dy, Ho, Er, Tm, Yb, Lu, and Y;

b, attaching the rare earth diffusion source containing the RE" element to a surface of the original cerium magnet by grain boundary diffusion at a melting point of the $REFe_2$ phase for 0.1 h to 48 h, where RE" is one or more selected from the group consisting of La, Pr, Nd, Pm, Eu, Gd, Tb, Dy, Ho, Er, Tm, Yb, Lu, and Y; and c, cooling directly to room temperature, or tempering at an eutectic temperature of a Ce-RE'-RE"-Fe phase for 0.5 h to 12 h and cooling to room temperature to obtain the final cerium magnet.

Further, the rare earth diffusion source containing the RE" element may be selected from the group consisting of a rare earth metal, a rare earth hydride, a rare earth fluoride, a rare earth oxide, and a rare earth alloy.

Further, when the grain boundary diffusion reaches a melting point of the $CeFe_2$ phase or the $(Ce,RE')Fe_2$ phase, the $CeFe_2$ phase or the $(Ce,RE')Fe_2$ phase may become a liquid phase; alternatively, the $CeFe_2$ phase or the $(Ce,RE')Fe_2$ phase may be reacted with a RE'-enriched phase to form a Ce-RE'-Fe multiphase liquid phase; heat preservation may be conducted at the melting point for 0.1 h to 48 h, such that the RE" element is diffused into the magnet along a channel of the $CeFe_2$ phase, the $(Ce,RE')Fe_2$ phase, or the Ce-RE'-Fe multiphase liquid phase, to form the $(CeRE")Fe_2$ phase, the $(Ce,RE',RE")Fe_2$ phase, or the Ce-RE'-RE"-Fe phase.

Further, the grain boundary diffusion may be conducted at 850° C. to 1,000° C.; and the tempering may be conducted at 400° C. to 700° C.

Further, the final cerium magnet may include the $(CeRE")Fe_2$ phase and a Ce-RE"-enriched phase, or the $(Ce,RE',RE")Fe_2$ phase and a Ce-RE'-RE"-enriched phase.

Further, the rare earth diffusion source may be attached by coating, evaporation, electrophoretic deposition, and magnetron sputtering.

Preferably, the RE" element may be one or two selected from the group consisting of Tb and Dy.

Preferably, the grain boundary diffusion may be conducted at 940° C. to 960° C.

Compared with the prior art, the present disclosure has the following beneficial effects:

1. Due to the presence of $REFe_2$ phase-forming elements such as cerium, the grain boundary phase of magnet includes the $REFe_2$ phase and a small amount of the rare earth-enriched phase, or includes completely the $REFe_2$ phase; since a melting point of the $REFe_2$ phase is higher than that of the rare-earth-enriched phase, common grain boundary diffusion processes have a low diffusion efficiency and a limited increase in the coercivity. In the present disclosure, the grain boundary diffusion is conducted near the melting point of the $REFe_2$ phase, such that all the grain boundary phases are transformed into liquid phases, to improve a diffusion efficiency of rare earth elements in the grain boundary.
2. The magnet after diffusion is directly cooled, or tempered near an eutectic temperature of a Ce-RE'-RE"-Fe phase; a new enhanced $REFe_2$ phase is formed in the cerium magnet, and subjected to interdiffusion with the main phase to a new main phase with a core-shell structure, thus improving coercivity of the grain boundary diffusion cerium-based magnet. A grain boundary diffusion cerium-based magnet with a squareness of not less than 95% can be obtained by optimized diffusion process and tempering process.
3. Rare earth elements capable of grain boundary diffusion are not limited to heavy rare earth elements such as Dy and Tb. The grain boundary diffusion of rare earth elements such as Pr and Nd can improve the coercivity and temperature stability of cerium magnet, thereby preparing SH and UH grades of grain boundary diffusion cerium-based magnets.
4. In the present disclosure, the grain boundary diffusion technology has desirable compatibility with the existing production processes, to rapidly realize batch preparation and production in the existing production lines.

DETAILED DESCRIPTION OF THE EMBODIMENTS

Figure 1:
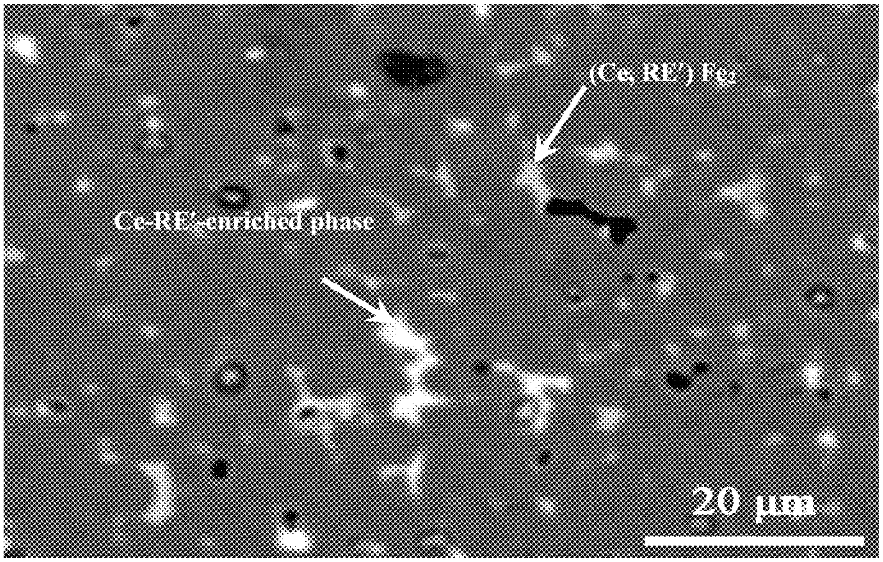
FIG. 1 shows a microstructure diagram of an original cerium magnet in examples of the present disclosure.

The present disclosure will be further described below in conjunction with the accompanying drawings and examples.

The present disclosure provides a grain boundary diffusion cerium-based magnet containing a $REFe_2$ phase, where an original cerium magnet has a chemical composition of $(Ce_x,RE'_{1-x})_a Fe_{100-a-b-c}TM_bB_c$, x is greater than or equal to 20 wt. % and less than or equal to 85 wt. %, a is greater than or equal to 28 and less than or equal to 35, b is greater than or equal to 0 and less than or equal to 10, and c is greater than or equal to 0.9 and less than or equal to 1.5; TM is one or more selected from the group consisting of Co, Al, Cu, Ga, Nb, Mo, Ti, Zr, and V; the original cerium magnet is prepared by sintering or hot pressing, and includes a 2-14-1 main phase, the $REFe_2$ phase, and a rare earth-enriched phase; the $REFe_2$ phase is selected from the group consisting of a $CeFe_2$ phase or a $(Ce,RE')Fe_2$ phase, and RE' is one or more selected from the group consisting of La, Pr, Nd, Pm, Eu, Gd, Tb, Dy, Ho, Er, Tm, Yb, Lu, and Y. An RE" element of a rare earth diffusion source is diffused into the original cerium magnet through the grain boundary diffusion at a melting point of the $REFe_2$ phase as a diffusion temperature; a treated original cerium magnet is directly cooled to room temperature or cooled to room temperature after tempering to obtain a final cerium magnet; and the final cerium magnet includes a new 2-14-1 main phase, a new enhanced $REFe_2$ phase, and a new rare earth-enriched phase; the new 2-14-1 main phase is selected from the group consisting of a $(Ce,RE'')_2Fe_{14}B$ main phase and a $(Ce,RE', RE'')_2Fe_{14}B$ main phase, the new enhanced $REFe_2$ phase is selected from the group consisting of a $(CeRE'')Fe_2$ phase and a $(Ce,RE', RE'')Fe_2$ phase; and RE" is one or more selected from the group consisting of La, Pr, Nd, Pm, Eu, Gd, Tb, Dy, Ho, Er, Tm, Yb, Lu, and Y.

A rare earth diffusion source containing RE" element is attached on a surface of the original cerium magnet; according to a type of the diffusion source-contained RE", the grain boundary diffusion is conducted at a melting point 850° C. to 1,000° C. of the $REFe_2$ phase for 0.1 to 48 h, such that the RE" element is diffused into the original cerium magnet along a channel of the $CeFe_2$ phase and a Ce-RE'-Fe liquid phase generated by a reaction of the $CeFe_2$ phase with a RE'-enriched phase, to form a $(CeRE'')Fe_2$ phase and a Ce-RE'-RE"-Fe phase; and tempering is conducted at an eutectic temperature 400° C. to 700° C. of the Ce-RE'-RE"-Fe phase for 0.5 h to 12 h, followed by cooling to room temperature to form a new enhanced $(CeRE'')Fe_2$ phase+Ce-RE"-enriched phase; alternatively, the RE" element is diffused into the original cerium magnet along a channel of a $(Ce,RE')Fe_2$ phase and the Ce-RE'-Fe liquid phase generated by a reaction of a $(Ce, RE')Fe_2$ phase with the RE'-enriched phase, to form a $(Ce,RE',RE'')Fe_2$ phase and the Ce-RE'-RE"-Fe phase; and tempering is conducted at an eutectic temperature 400° C. to 700° C. of the Ce-RE'-RE"-Fe phase for 0.5 h to 12 h, followed by cooling to room temperature to form a new enhanced $(Ce,RE',RE'')Fe_2$ phase+Ce-RE'-RE"-enriched phase; where and RE" is one or more selected from the group consisting of La, Pr, Nd, Pm, Eu, Gd, Tb, Dy, Ho, Er, Tm, Yb, Lu, and Y.

When an anisotropy field of $RE''_2Fe_{14}B$ phase is larger than that of $Ce_2Fe_{14}B$ or $(Ce,RE')_2Fe_{14}B$ phase, the RE" element has an enhancing effect on the grain boundary, and is subjected to interdiffusion with the main phase to form a new main phase with a core-shell structure, thereby enhancing the coercivity of grain boundary diffusion cerium-based magnet.

The rare earth diffusion source is attached by, but not limited to coating, evaporation, electrophoretic deposition, and magnetron sputtering.

The rare earth diffusion source is selected from the group consisting of, but not limited to a rare earth metal, a rare earth hydride, a rare earth fluoride, a rare earth oxide, and a rare earth alloy.

Example 1

An original cerium magnet was a 38M cerium magnet with a Ce content accounting for 20 wt % of a total amount of rare earths, and having an alloy composition of $(Ce_{0.2}Nd_{0.7}Ho_{0.1})_{31.5}Fe_{66.5}B_{1.0}Co_{0.4}Cu_{0.2}Al_{0.2}Nb_{0.2}$.

(1) Metal Tb was roughly crushed, and subjected to hydrogen decrepitation to obtain $TbH_3$; and the $TbH_3$ was ball-milled for 12 h under the protection of ethanol to obtain a diffusion source slurry, where the ethanol to the $TbH_3$ had a mass ratio of 1:1.

(2) The original 38M cerium magnet was cut into a Φ10*5 $mm^3$ cylinder, oil stains on a surface of the magnet was washed off, and an oxide layer on the surface was removed use sandpapers.

(3) The diffusion source slurry mixed by $TbH_3$ and ethanol was coated on the surface of the cylindrical magnet to obtain a diffusion source-attached magnet.

(4) The diffusion source-attached cerium magnet was diffused for 10 h near a melting point (940° C.) of a $(Ce,Nd,Ho)Fe_2$ phase.

(5) A diffused magnet was tempered at 500° C. for 2 h to obtain a grain boundary diffusion cerium-based magnet containing a $(Ce,Nd,Ho,Tb)Fe_2$ phase.

A magnet of Comparative Example 1 with a same composition of magnet and a heavy rare earth coating was subjected to grain boundary diffusion at 840° C. for 10 h, and then tempered at 500° C. for 2 h.

The properties of the original cerium magnet and the magnets in Comparative Example 1 and Example 1 were listed in Table 1. The original cerium magnet has coercivity of 14.19 kOe; in Comparative Example 1, the magnet subjected to conventional grain boundary diffusion at 840° C./10 h has coercivity increased by 5.20 kOe; in Example 1, the magnet has coercivity increased by 7.38 kOe after the grain boundary diffusion at 940° C./10 h, reaching 21.57 kOe, and remanence does not decrease, which is comparable to that of the conventionally-diffused magnet, meeting requirements of coercivity and magnetic energy product of a 38SH magnet.

TABLE 1

| Magnet | Hcj(kOe) | Br(kGs) | $(BH)_{max}$ (MGOe) |
|---|---|---|---|
| Original 38M magnet | 14.19 | 12.59 | 38.25 |
| Magnet of Comparative Example 1: diffusion at 840° C./10 h | 19.39 | 12.25 | 36.60 |
| Magnet of Example 1: diffusion at 940° C./10 h | 21.57 | 12.24 | 36.23 |

Example 2

An original cerium magnet had a Ce content accounting for 30 wt % of a total amount of rare earths, and an alloy composition of $(Ce_{0.3}Nd_{0.6}Gd_{0.1})_{31}Fe_{67}B_{1.0}Co_{0.2}Cu_{0.2}Al_{0.4}Nb_{0.2}$. The magnet had a remanence of 12.18 kGs, coercivity of 11.86 kOe and a magnetic energy product of 34.96 MGOe.

Metal Dy was sputtered on a surface of the above magnet by magnetron sputtering for 40 min; under vacuum conditions, grain boundary diffusion was conducted at 850° C./48 h, tempering was conducted near an eutectic temperature 700° C. of Ce-RE'-Gd for 12 h, followed by rapidly cooling to room temperature to obtain a magnet of Example 2.

The magnet of Comparative Example 2 (with a same composition and coating as Example 2) was treated by grain boundary diffusion at 850° C./48 h, and then tempered conventionally at 520° C. for 12 h.

The properties of the three magnets with different states were listed in Table 2. After a reasonable Dy grain boundary diffusion process, followed by conventional (520° C./12 h) tempering, the magnet has coercivity increased by 3.77 kOe; while the grain boundary diffusion cerium-based magnet tempered at the eutectic temperature (700° C./12 h) of CE-RE'-Gd has coercivity of 1.01 kOe higher than that of the magnets using conventional tempering process, reaching 16.64 kOe, and the magnet has an Hk/Hcj value greater than 95, with its demagnetization curve still maintaining a desirable squareness.

Figure 2:
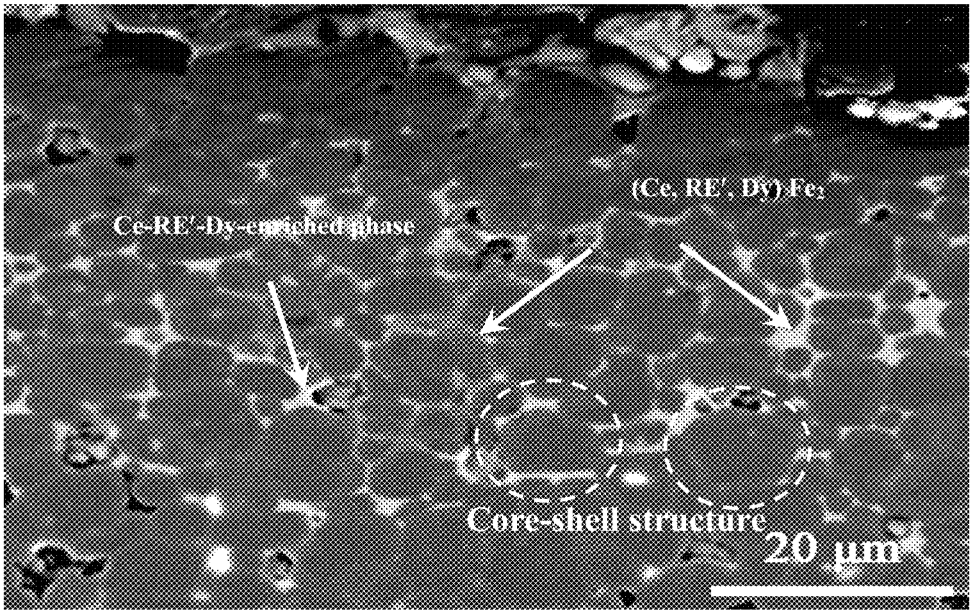
FIG. 2 shows a microstructure diagram of a grain boundary diffusion Dy magnet of FIG. 1.

FIG. 1 and FIG. 2 show microstructures of the original cerium magnet and its grain boundary diffusion Dy magnet in Example 2. A white grain boundary phase between main phase grains in the original cerium magnet is a Ce-RE'- enriched phase; and a gray phase between the grains is a (Ce,RE')$Fe_2$ phase, as shown in FIG. 1. After the grain boundary diffusion of Dy element, a microstructure of the magnet is shown in FIG. 2, where the Dy element enters a rare earth-enriched phase to form a Ce-RE'-Dy-enriched phase; the Dy element is diffused into the (Ce,RE')$Fe_2$ phase to form a large amount of (Ce,RE',Dy)$Fe_2$ phases that are uniformly distributed among the main phase grains in the grain boundary diffusion magnet. Meanwhile, due to the diffusion of Dy element between the grain boundary phase and the main phase grains, a $(Dy,Ce,RE')_2Fe_{14}B$ phase in a core-shell structure and with a Dy-enriched shell layer is formed at edges of the main phase grains, as shown by a circled part in FIG. 2. FIG. 2 shows typical features of the microstructure of grain boundary diffusion cerium-based magnet with a $REFe_2$ phase.

TABLE 2

| | Hcj(kOe) | Br(kGs) | $(BH)_{max}$ (MGOe) | Hk/ Hcj(%) |
|---|---|---|---|---|
| Original cerium magnet | 11.86 | 12.18 | 34.96 | 97.5 |
| Magnet of Comparative Example 2: at 850° C./48 h + 520° C./12 h | 15.63 | 11.80 | 32.88 | 94.2 |
| Magnet of Example 2: at 850° C./48 h + 700° C./12 h | 16.64 | 11.85 | 33.01 | 95.6 |

Example 3

An original cerium magnet had a Ce content accounting for 20 wt % of a total amount of rare earths, and an alloy composition of $(Ce_{0.2}Nd_{0.7}Dy_{0.1})_{31.5}Fe_{66.5}B_{1.0}Co_{0.3}Cu_{0.2}Al_{0.4}$. The magnet had a remanence of 12.15 kGs, coercivity of 16.06 kOe and a magnetic energy product of 34.60 MGOe.

A metal Tb powder was sputtered on a surface of the above magnet by spraying; under vacuum conditions, grain boundary diffusion was conducted at 1,000° C./0.1 h, followed by rapidly cooling to room temperature to obtain a magnet of Example 3.

The magnet of Comparative Example 3 (with a same composition and coating as Example 3) was treated by grain boundary diffusion at 840° C./0.1 h.

The properties of the three magnets with different states were listed in Table 3. After diffusing Tb at 1,000° C./0.1 h, the magnet has coercivity reaching 18.26 kOe, which is 2.20 kOe higher than that of the original magnet. Although a diffusion time in this example is short, since a diffusion temperature is high, and the rare earth-enriched phase and the $REFe_2$ phase each are liquid, the heavy rare earth Tb can rapidly enter the magnet by grain boundary diffusion at high temperature, thereby enhancing the coercivity. In the magnet of Comparative Example 3, since there is a low diffusion temperature, and only the rare earth-enriched phase is liquid, there is little diffusion of heavy rare earth into the magnet, resulting in coercivity only slightly increased by 0.36 kOe.

TABLE 3

| | Hcj(kOe) | Br(kGs) | $(BH)_{max}$ (MGOe) |
|---|---|---|---|
| Original cerium magnet | 16.06 | 12.15 | 34.60 |
| Magnet of Comparative Example 3: at 840° C./0.1 h | 16.42 | 12.13 | 34.51 |
| Magnet of Example 3: at 1,000° C./0.1 h | 18.26 | 12.13 | 34.53 |

Example 4

A high-cerium magnet with a Ce content of up to 85 wt. % was prepared without PrNd elements, where the magnet had an alloy composition of $(Ce_{0.85}Nd_{0.15})_{32.3}Fe_{65.5}B_{1.3}Co_{0.2}Al_{0.3}Cu_{0.2}Zr_{0.2}$, and all grain boundary phases each were a (Ce,Nd)$Fe_2$ phase. Metal Dy was sputtered on a surface of the above magnet by magnetron sputtering for 60 min; under vacuum conditions, grain boundary diffusion was conducted at 940° C. for 10 h (since there was a high Ce content, resulting in a decreased melting point of the (Ce,Nd)$Fe_2$ phase); and tempering was conducted at 400° C./0.5 h to obtain a magnet of Example 4. As shown in Table 4, after grain boundary diffusion at 940° C./10 h and tempering at 400° C./0.5 h, the high-Ce magnet has coercivity increased from 2.37 kOe to 6.53 kOe, with an increasing rate of 175%; and the magnet has a significantly improved magnetic energy product, as well as squareness increased from 84% to about 90%.

TABLE 4

| | Hcj(kOe) | Br(kGs) | $(BH)_{max}$ (MGOe) | Hk/ Hcj(%) |
|---|---|---|---|---|
| Original cerium magnet | 2.37 | 9.15 | 12.53 | 84.0 |
| Magnet of Example 4: 940° C./10 h + 400° C./0.5 h | 6.53 | 9.09 | 19.50 | 90.0 |

The above description of the embodiments is intended to facilitate a person of ordinary skill in the art to understand and use the disclosure. Obviously, a person skilled in the art can easily make various modifications to these examples, and apply a general principle described herein to other examples without creative efforts. Therefore, the present disclosure is not limited to the aforementioned examples. All improvements and modifications made by those skilled in the art according to the principle of the present disclosure without departing from the scope of the present disclosure should fall within the protection scope of the present disclosure.

What is claimed is:

1. A grain boundary diffusion cerium-based magnet containing a $REFe_2$ phase, wherein an original cerium magnet has a chemical composition of $(Cex,RE'_{1-x})_aFe_{99-a-b}B_{0.9-1.2}TM_b$, x is greater than or equal to 20 wt. % and less than or equal to 85 wt. %, a is greater than or equal to 28 and less than or equal to 35, and b is greater than or equal to 0 and less than or equal to 10; TM is one or more selected from the group consisting of Co, Al, Cu, Ga, Nb, Mo, Ti, Zr, and V; the original cerium magnet is prepared by sintering or hot pressing, and comprises a 2-14-1 main phase, the $REFe_2$ phase, and a rare earth-enriched phase; the $REFe_2$ phase is selected from the group consisting of a $CeFe_2$ phase and a (Ce,RE')$Fe_2$ phase, and RE' is one or more selected from the group consisting of La, Pr, Nd, Pm, Eu, Gd, Tb, Dy, Ho, Er, Tm, Yb, Lu, and Y; and an RE" element of a rare earth diffusion source is diffused into the original cerium magnet through grain boundary diffusion at a melting point of the $REFe_2$ phase as a diffusion temperature; a resulting treated original cerium magnet is directly cooled to room temperature or cooled to room temperature after tempering to obtain a final cerium magnet; and the final cerium magnet comprises a new 2-14-1 main phase, a new enhanced $REFe_2$ phase, and a new rare earth-enriched phase; the new 2-14-1 main phase is selected from the group consisting of a $(Ce,RE'')_2Fe_{14}B$ main phase and a $(Ce,RE',RE'')_2Fe_{14}B$ main phase, the new enhanced $REFe_2$ phase is selected from the group consisting of a $(Ce,RE'')Fe_2$ phase and a $(Ce,RE',RE'')Fe_2$ phase; and RE" is one or more selected from the group consisting of La, Pr, Nd, Pm, Eu, Gd, Tb, Dy, Ho, Er, Tm, Yb, Lu, and Y; and wherein the RE" element forms a $(Ce,RE'')_2Fe_{14}B$ main phase or a $(Ce,RE'RE'')_2Fe_{14}B$ main phase with a core-shell structure at an edge of main phase grains, and a shell layer in the core-shell structure consists of the RE" element.

2. The grain boundary diffusion cerium-based magnet containing the $REFe_2$ phase according to claim 1, wherein an anisotropy field of the $RE''_2Fe_{14}B$ phase is larger than that of the $Ce_2Fe_{14}B$ phase or the $(Ce,RE')_2Fe_{14}B$ phase.

3. The grain boundary diffusion cerium-based magnet containing the $REFe_2$ phase according to claim 1, wherein the grain boundary diffusion is conducted at 850° C. to 1,000° C. for 0.1 h to 48 h.

4. The grain boundary diffusion cerium-based magnet containing the $REFe_2$ phase according to claim 1, wherein the tempering is conducted at an eutectic temperature of a Ce-RE'-RE"-Fe phase of 400° C. to 700° C. for 0.5 h to 12 h.

5. The grain boundary diffusion cerium-based magnet containing the $REFe_2$ phase according to claim 1, wherein the rare earth diffusion source containing the RE" element is selected from the group consisting of a rare earth metal, a rare earth hydride, a rare earth fluoride, a rare earth oxide, and a rare earth alloy.

6. A preparation method of the grain boundary diffusion cerium-based magnet containing the $REFe_2$ phase according to claim 1, comprising the following steps:

a, preparing a blocky original cerium magnet with the chemical composition of $(Cex,RE'_{1-x})_aFe_{99-a-b}B_{0.9-1.2}TM_b$ by sintering or hot pressing, where x is greater than or equal to 20 wt. % and less than or equal to 85 wt. %, a is greater than or equal to 28 and less than or equal to 35, and b is greater than or equal to 0 and less than or equal to 10, and c is greater than or equal to 0.9 and less than or equal to 1.5; TM is one or more selected from the group consisting of Co, Al, Cu, Ga, Nb, Mo, Ti, Zr, and V; the original cerium magnet comprises the 2-14-1 main phase, the $REFe_2$ phase, and the rare earth-enriched phase; the $REFe_2$ phase is selected from the group consisting of the $CeFe_2$ phase and the $(Ce,RE')Fe_2$ phase, and RE' is one or more selected from the group consisting of La, Pr, Nd, Pm, Eu, Gd, Tb, Dy, Ho, Er, Tm, Yb, Lu, and Y;

b, attaching the rare earth diffusion source containing the RE" element to a surface of the original cerium magnet by the grain boundary diffusion at the melting point of the $REFe_2$ phase for 0.1 h to 48 h, wherein RE" is one or more selected from the group consisting of La, Pr, Nd, Pm, Eu, Gd, Tb, Dy, Ho, Er, Tm, Yb, Lu, and Y; and c, cooling directly to room temperature, or tempering at an eutectic temperature of a Ce-RE'-RE"-Fe phase for 0.5 h to 12 h and cooling to room temperature to obtain the final cerium magnet.

7. The method according to claim 6, wherein the rare earth diffusion source containing the RE" element is selected from the group consisting of a rare earth metal, a rare earth hydride, a rare earth fluoride, a rare earth oxide, and a rare earth alloy.

8. The method according to claim 6, wherein when the grain boundary diffusion reaches a melting point of the $CeFe_2$ phase or the $(Ce,RE')Fe_2$ phase, the $CeFe_2$ phase or the $(Ce,RE')Fe_2$ phase becomes a liquid phase; alternatively, the $CeFe_2$ phase or the $(Ce,RE')Fe_2$ phase is reacted with a RE'-enriched phase to form a Ce-RE'-Fe multiphase liquid phase; heat preservation is conducted at the melting point for 0.1 h to 48 h, such that the RE" element is diffused into a magnet along a channel of the $CeFe_2$ phase, the $(Ce,RE')Fe_2$ phase, or the Ce-RE'-Fe multiphase liquid phase, to form the $(CeRE'')Fe_2$ phase, the $(Ce,RE',RE'')Fe_2$ phase, or the Ce-RE'-RE"-Fe phase.

9. The method according to claim 6, wherein the grain boundary diffusion is conducted at 850° C. to 1,000° C.; and the tempering is conducted at 400° C. to 700° C.

10. The method according to claim 6, wherein the final cerium magnet comprises the $(Ce,RE'')Fe_2$ phase and a Ce-RE"-enriched phase, or the $(Ce,RE',RE'')Fe_2$ phase and a Ce-RE'-RE"-enriched phase.

11. The method according to claim 6, wherein the rare earth diffusion source is attached by coating, evaporation, electrophoretic deposition, and magnetron sputtering.

12. The method according to claim 6, wherein the RE" element is one or two selected from the group consisting of Tb and Dy.

13. The method according to claim 6, wherein the grain boundary diffusion is conducted at 940° C. to 960° C.

* * * * *